Aug. 1, 1944. G. KEITH ET AL 2,354,687
BRAKE APPLYING SYSTEM
Filed April 28, 1942
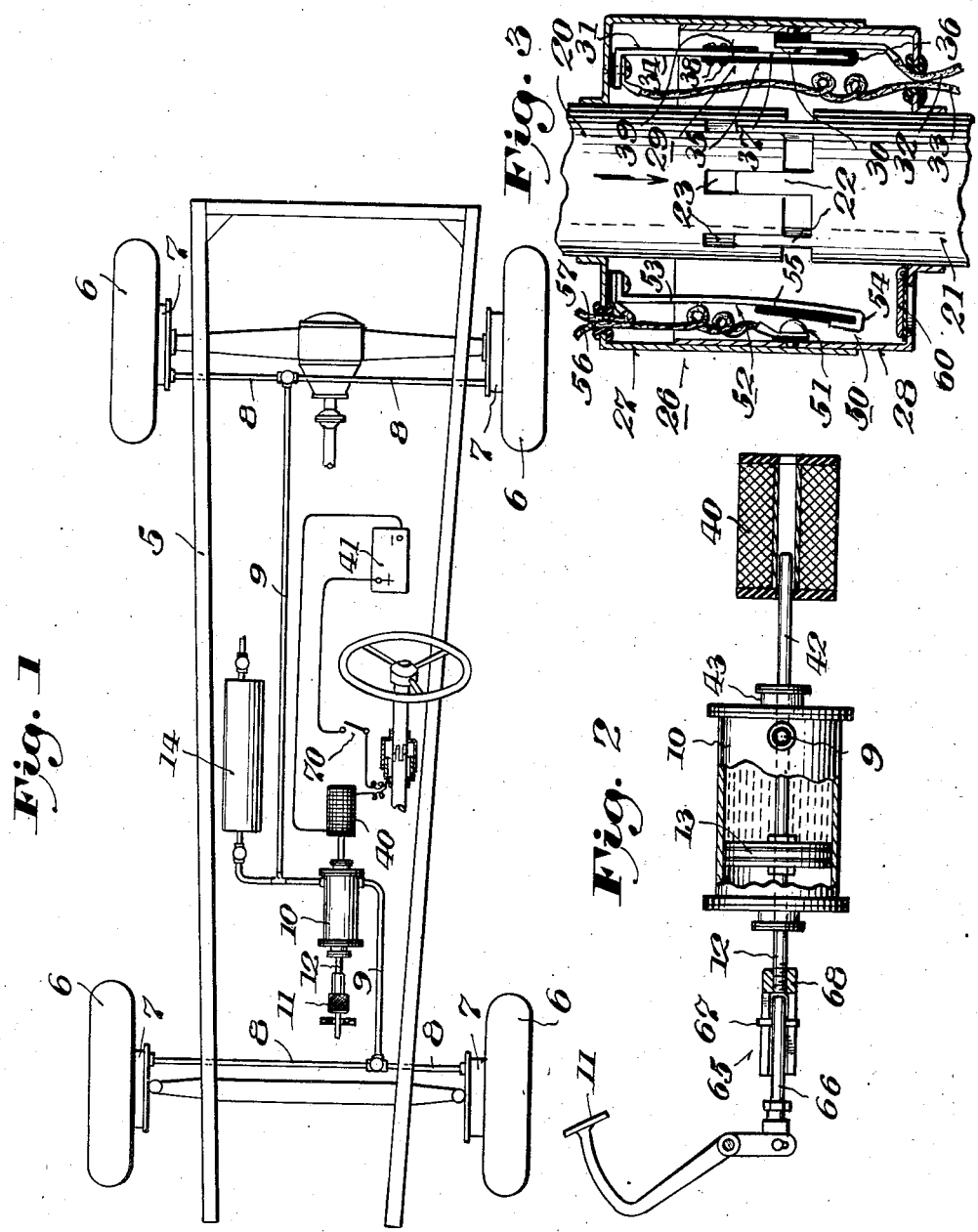
Inventors
Glenn Keith,
Albert H. Kirchner,
By Dyve & Kirchner
Attorneys Patented Aug. 1, 1944

2,354,687

UNITED STATES PATENT OFFICE 2,354,687

BRAKE APPLYING SYSTEM

Glenn Keith, East Detroit, Mich., and Albert H. Kirchner, Washington, D. C.

Application April 28, 1942, Serial No. 440,862

16 Claims. (Cl. 180—82)

This invention relates to automatic brake applying devices for automotive vehicles.

More specifically, the invention provides means for automatically applying or setting the brakes of an automotive truck or other vehicle upon the driver thereof becoming incapacitated.

The invention is of peculiar utility and has particular application to military vehicles, especially such as are used under actual combat conditions. It has heretofore been recognized that whenever for any reason the driver of any type of automotive vehicle becomes incapacitated, it is desirable that the vehicle be brought promptly to rest. Obviously, the need for automatic stopping means is greatest in the case of military vehicles operated under combat conditions, since under such circumstances the drivers of such vehicles are subjected to the hazards of gunfire in addition to what may be considered ordinary and normal factors tending to distract or incapacitate any driver.

Attempts have been made heretofore to provide means in automotive vehicles which will require the driver to make a deliberate and conscious effort to maintain the brakes released and which will be automatically operative to apply the brakes upon the cessation of such effort. However, the best of such prior art systems have proved to be impractical and ineffective for various reasons. An important object of the present invention is to introduce improvements to eliminate the defects and disadvantages that have kept systems of this general type out of widespread use.

A related object of the invention is to simplify the physical structure and to embody it in a form which is inexpensive to manufacture and easy to apply to existing vehicles.

A further object is to provide an actuating means which will automatically set the brakes without fail upon the driver's becoming incapacitated, even though the driver lose consciousness and slump over the steering wheel.

A further important object is to provide an electrically controlled mechanism for accomplishing the foregoing purposes and to incorporate in such mechanism means for opening the operating circuit after a predetermined period of time, so that unnecessary drain on the battery or other current source is avoided.

A still further object is to incorporate in a system of the class described means for applying in an emergency the same braking parts that are employed in normally bringing the vehicle to a stop, and a closely related object is to eliminate from the load borne by the emergency operating system those actuating or controlling parts which are peculiar to the normally used system. More specifically, the present system is electrically operated and employs the usual standard brake shoes and drums, but these instrumentalities are operated under emergency conditions without moving the conventional spring-operated pedal and its associated linkage.

An additional object is to incorporate a system of this general class in a physical construction which will be foolproof and unfailing in operation and which cannot be circumvented by a driver of the vehicle on which it is provided.

Further objects and advantages of the system will become apparent as the following description of a preferred form of embodiment is read in connection with the appended drawing.

In the drawing,

Figure 1 shows, generally schematically, in plan view the running gear of a conventional type of automotive vehicle having a fluid braking system, with one embodiment of the present invention incorporated therein;

Fig. 2 shows in longitudinal vertical section certain parts of the new system, including a brake pedal, a master cylinder, and a solenoid device; and Fig. 3 shows in axial section a portion of a steering column with certain of the control parts of the present invention mounted therein.

It is to be understood at the outset that the invention is of wide application and may be embodied in forms and physical structure different from those selected for illustration. The drawing is of generally diagrammatic type and does not purport to depict all the structural details in which the system is incorporated. Those details may be varied considerably within the broad principles of the invention as defined by the appended claims.

In the drawing, Fig. 1 illustrates a conventional running gear including a frame 5, wheels 6, brake housings 7, brake fluid conduit branches 8, master brake lines 9, a master cylinder 10, and a pedal 11 operatively connected by a rod 12 to the piston 13 (Fig. 2) of the master cylinder. The arrangement may be a power brake system including a reservoir 14, or it may be a simple manual system. In either case, the housings 7 enclose suitable brake shoes cooperating with brake drums, applicable by pressure in the branch lines and retractable by spring devices or the like. All the foregoing is conventional and well known and need not be described with further particularity.

It is an object of the invention to provide means for setting the brakes automatically upon the driver of the vehicle for any reason relaxing the conscious effort which he must make continually to prevent the actuation of the automatic means. The automatic actuating element is associated with the steering column, which extends angularly back at a very substantial angle to the horizontal, so that the axis of the steering column thus has an appreciable vertical component. The column is divided transversely into an upper portion 20 and a lower portion 21, which are splined together by the interfitting of integral keys 22 and keyways 23, as shown in Fig. 3. The lower portion 21 is relatively fixed and operates the customary steering gear. The upper portion 20 is free to move axially with respect to the lower portion, while the two portions are constrained to rotate together. Any other expedient permitting axial lifting and dropping of the upper portion while preventing relative rotation of the upper and lower portions may be adopted.

The force of gravity normally keeps the upper portion 20 in its lowermost position, below that illustrated in Fig. 3, but the arrangement is such that to operate the vehicle the driver must pull upwardly on the steering wheel to maintain the upper portion 20 in its uppermost position, higher than that illustrated in Fig. 3. The arrangement is such that if the column is allowed to drop, the brakes will be automatically applied for a predetermined interval of time, following which they will be released in order to prevent waste of the applying power, which in the present case is electrical energy. This is accomplished by the novel control means incorporated in a special housing 26 provided on the steering column, which will now be described.

The housing or casing 26 is made in the form of two telescoping halves, each annular in plan, the upper half 27 being sleeved around and fastened to the upper portion 20 of the steering column, and the lower half 28 being sleeved around and fastened to the lower portion 21 of the column. A brake-controlling switch 29 is provided in the casing and comprises an electrical contact button 30 mounted in and insulated from one of the halves, as for example the half 28, and a cooperating switch finger 31 mounted in and insulated from the other half, wire leads 32, 33 being connected to the button and finger respectively and issuing from the casing through a packed opening.

The switch finger is specially constructed, comprising a resilient strip 34 of conductive metal terminating at its free end portion in a non-conducting backing 35 clamped at 36 around the lower end of a strip of high resistance metal 37 whose upper end is in electrical contact with the strip 34 and is clamped thereto by a rivet or the like 38 which passes through the non-conducting backing 35 and a front facing button 39 of nonconducting material.

The leads 32, 33 are extended respectively to a solenoid 40 and to a source of electrical energy, which may be the usual battery 41 of the vehicle, as shown in Fig. 1. For the sake of simplicity the battery is shown directly connected, but of course any suitable coil or the like may be interposed to modify the characteristics of the current or voltage supplied to the solenoid. The armature of the solenoid is a rod or the like 42 extended through a gland 43 from the piston 13 of the master brake cylinder 10 or otherwise rigidly connected to the operating rod 12 thereof.

It will be apparent that with the parts in the position shown in Fig. 3 a circuit will be completed through the switch 29 to energize the solenoid and apply the brakes, while the circuit will be open if the upper portion 20 of the steering column is raised to bring the lower end of the nonconducting strip 35 into engagement with the button 30 or if the upper portion 20 is dropped to bring the nonconducting button 38 into such engagement. Obviously, in order to maintain the brakes unapplied, so that the vehicle can be operated, the steering wheel must be kept in its uppermost or its lowermost position.

It is an object of the invention to require the operator to keep the steering wheel in its uppermost position in order to enable the vehicle to be driven, and this is accomplished by cooperation of the ignition circuit switch 50 shown at the lefthand side of Fig. 3. This switch includes a metallic button 51 mounted in and insulated from the lower half of the casing 26 which is rubbed by a spring finger 52 carried by and insulated from the upper half of the casing. This finger includes a resilient metal strip 53 having its lower or free end bent around at 54 to clamp a strip of non-conducting material 55. Leads 56, 57 from the switch 50 are in series with the ignition circuit of the vehicle, which may include the usual lock-controlled main ignition switch.

The elements of the switch 50 are so formed and proportioned with respect to each other and with respect to the elements of the switch 29 that when the steering wheel of the vehicle is in lowered position the ignition circuit is open by engagement of parts 55 and 51, while the ignition circuit is closed through the switch 50 only when the steering wheel is held in uppermost position so as to bring the parts 54 and 51 of the switch 50 into engagement. In this latter position, it will be remembered, parts 36 and 30 of the switch 29 are engaged, so that the brake-applying circuit is open. Thus the vehicle can be driven only so long as the steering wheel is held up against the tendency of gravity to lower it, or against the action of some positive lowering means, such as a spring, weight or the like which may be optionally employed for the purpose.

It is obvious that as soon as the driver for any reason ceases holding the steering wheel up, the brakes will be electrically applied automatically and the vehicle motor will be shut off. Assuming that the clutch parts remain engaged, the drag of the dead motor will contribute materially toward bringing the vehicle to a stop. The use of high resistance material for the strip 37, which is desirable but optional, has the advantage causing the amount of the current flowing through the switch 29 to the solenoid 40 to increase gradually as the steering wheel settles, so that application of the brakes is not abrupt or sudden but is progressive and gradual. When the wheel has dropped almost to its lowermost position the brakes are most powerfully applied, since the length of high resistance metal 37 traversed by the current is then shortest, and immediately thereafter, when the wheel has dropped to its lowermost position, the button 39 engages the button 30 and the brake-applying circuit opens, in order to avoid unnecessary drain on the battery 41 or other source.

It is assumed that the vehicle will have been brought to a complete stop by the time the wheel settles to lowermost position and the brakes become released. To make certain that the brake-applying circuit remains closed during a sufficiently long time it is desirable to provide retarding or time-delay means at some appropriate place in the system to prevent too rapid movement of the parts. A convenient type of such means is a dashpot, and Fig. 3 shows a form of dashpot incorporated in the structure of the casing 26. As there shown, the halves of the casing make a quite snug fit with each other and with the steering column so that air will be compressed within the casing when the halves move together and such movement will be delayed and retarded while the compressed air leaks out from the casing. If desired, an adjustable air exit port may be provided in the casing. Of course the openings through which the wire leads 32, 33, 56, 57 extend are well packed to prevent undesired leakage. Conveniently all these leads will issue through a single opening, but they are shown separated in the drawing for the sake of simplicity and clarity of illustration.

The dashpot feature involves a further advantage since it prevents undesired lowering of the steering wheel and application of the brakes in response to vibration or jolting of the vehicle and the driver. The difficulty of maintaining the steering wheel constantly in full uppermost position while travelling over rough terrain may sometimes be considerable, but it is minimized by the resistance to lowering afforded by the dashpot feature. As a further safeguard against accidental and undesired lowering of the wheel to an extent that would apply the brakes, it is best to arrange the proportions of the parts of the switches 29 and 50 in such a way that as the wheel moves down the switch 50 will open before the switch 29 closes. In this way, should the driver inadvertently tend to allow the steering wheel to settle too far down, he will be warned of that fact by the momentary cutting off of the ignition current so that he can promptly raise the steering wheel before the brakes become applied.

In order to facilitate lifting of the steering wheel against the partial vacuum that would otherwise be produced in the casing 26, it is convenient to provide a check valve like that shown at 60. It will be understood that this valve opens in response to atmospheric pressure when the upper half of the casing is lifted and drops in response to gravity immediately thereafter, remaining closed when the upper half of the casing is lowered.

In order to relieve the load which must be moved by the solenoid in applying the brakes it is desirable to provide a loose connection like that shown at 65 in the master brake cylinder piston rod 12. As there shown, the rod is divided into the portions 12 and 66 which are connected by splining 67 on one of the divisions travelling in a slot or plurality of slots formed in a sleeve 68 mounted on the other division. This construction enables movement of the division 66 to the right in Fig. 2, in response to downward movement of the pedal 11, to engage and move the division 12 just as though the two divisions were one, while the armature 42 is able to pull the piston 13 to the right without having to move the division 66, the pedal 11, the interposed linkage and the customary pedal-retracting spring.

A master control switch, preferably lock-controlled and diagrammatically indicated at 70 in Fig. 1, may be included anywhere in the brake-applying circuit to render this circuit inoperative whenever desired. A similar switch (not shown) may be included also to short the switch 50 when the system is not to be used, so that the ignition circuit will be controlled exclusively by the usual ignition switch.

It is contemplated that in commercial production the parts will be considerably simplified. For example, it is proposed to unite the switches 29 and 50 by mounting the lower, fixed buttons of these two switches on a single support and by mounting the upper, movable fingers thereof together. The switches are shown separated and independent in the drawing in order to make their function and essential structure clear and readily understandable.

It will be obvious that the several circuits entering the casing 26 need not require as many as the four leads thereto which are shown in the drawing for the sake of simplicity and clarity, since some of the electrical contacts can be grounded and ground paths may thus be substituted for wire connections. In either case, whether wire connections or ground paths are used, it is preferable to extend all the leads out from the casing through a single opening, since this will make it necessary to pack one opening instead of two. The wiring is of course best enclosed in suitable armored sheathing to prevent damage and tampering.

It is believed now to be clear that the system covered by this application, explained hereinabove in one exemplary or representative form of embodiment, accomplishes the objects set out first hereinabove and incorporates numerous substantial advantages. In many respects the arrangement is believed to be superior to the best devices of the prior art. Thus, for example, to mention but a few of the advantages of the present invention, automatic braking is unfailingly initiated instantly the driver of the vehicle becomes incapacitated, even though he slump over the steering wheel; the structure involves but little change in or addition to vehicles already made and in operation, since all the control parts are self-contained in their housing and since the operating parts are mainly those already present on the vehicle, the sole major change being the division and splining of the steering column. The device is readily removed by simply removing the housing 26 and fastening the divided parts of the steering column together. The system involves no change in operating technique on the part of the driver except that it requires him to maintain the steering wheel held up, and it is foolproof and cannot be circumvented by the driver.

What is claimed is:

1. A brake applying system for an automotive vehicle provided with a steering column the axis of which has a vertical component, said system comprising control means including upper and lower steering column parts interlocked for rotation together and axially slidable for lengthwise separation and a switch adapted to be operated to apply a brake when the upper part of the steering column is moved downwardly.

2. A brake applying system for an automotive vehicle comprising electrical means for applying a brake, a switch adapted to be closed to energize the electrical means, and a steering column the axis of which has a vertical component and which includes upper and lower portions interlocked for rotation together and axially slidable for lengthwise separation, said portions respectively mounting parts of said switch so as to maintain the switch open when said portions are extended and to close the switch when said portions are moved together.

3. A brake applying system for an automotive vehicle comprising electrical means for applying a brake, a switch adapted to be closed to energize the electrical means, said switch being biased toward closing position and requiring conscious effort by the driver of the vehicle to maintain the switch in open position, and means automatically operative to open the switch after the same has been closed for a predetermined period.

4. A brake applying system for an automotive vehicle comprising electrical means for applying a brake, a switch movable between terminal open positions and through an intermediate closed position to control the electrical means, said switch being biased toward one of said terminal positions, and means for retarding movement of the switch through said intermediate position.

5. A brake applying system for an automotive vehicle comprising electrical means for applying a brake, a switch movable between terminal open positions and through an intermediate closed position to control the electrical means, said switch being biased toward one of said terminal positions, and a second switch controlling the motive power of the vehicle and cooperating with the first switch to deprive the vehicle of motive power when the first switch is in intermediate position.

6. A brake applying system for an automotive vehicle having an internal combustion engine and an ignition circuit and having a brake, said system including electrical means for applying the brake, a switch movable between terminal open positions and through an intermediate closed position to control the electrical means, said switch being biased toward one of said terminal positions, and a switch in the ignition circuit cooperating with the first switch and movable to open said circuit when the first switch is in intermediate position.

7. A brake applying system for an automotive vehicle comprising electrical means for applying a brake, a switch adapted to be closed to energize the electrical means, said switch being biased toward closing position and requiring conscious effort by the driver of the vehicle to maintain the switch in open position, and a dashpot device for retarding movement of the switch from open to closing position.

8. A brake applying system for an automotive vehicle comprising electrical means for applying a brake, a switch movable between terminal open positions and through an intermediate closed position to control the electrical means, said switch being biased toward one of said terminal positions, and a dashpot device for retarding movement of the switch from one terminal position to the intermediate position and for delaying movement from the intermediate position to the other terminal position.

9. A brake applying system for an automotive vehicle comprising electrical means for applying a brake, a switch movable between terminal open positions and through an intermediate closed position to control the electrical means, said switch being biased toward one of said terminal positions, a dashpot device for retarding movement of the switch from one terminal position to the intermediate position and for delaying movement from the intermediate position to the other terminal position, and a check valve cooperating with the dashpot device for preventing the latter from offering appreciable resistance to movement of the switch toward the terminal position opposite that toward which it is biased.

10. A brake applying system for an automotive vehicle comprising electrical means for applying a brake, a switch movable through closed position to energize the electrical means, said switch being biased into closed position and requiring conscious effort by the driver of the vehicle to maintain the switch in open position, and said switch including a variable resistance operable as the switch moves through closed position progressively to increase the current supplied to the electrical means so as to produce a progressively increasing brake applying effect.

11. A brake applying system for an automotive vehicle comprising electrical means for applying a brake, a switch controlling said electrical means and movable from a first terminal open position through a closed position and into a second terminal open position, said switch being biased into said second terminal open position and requiring a conscious effort by the driver of the vehicle to maintain the switch in said first terminal open position, and means operable as the switch moves between terminal positions responsive to the biasing to progressively increase the current supplied to the electrical means so as to produce a progressively increasing brake applying effect.

12. A brake applying system for an automotive vehicle having an internal combustion engine and an ignition circuit and having a brake, said system including electrical means for applying the brake, a switch movable between terminal open positions and through an intermediate closed position to control the electrical means, said switch being biased toward one of said terminal positions, and a switch in the ignition circuit cooperating with the first switch and movable to open said circuit just prior to movement of the first switch from the terminal position opposite the last named one to said intermediate position.

13. A brake applying system for an automotive vehicle having a driving motor, a steering wheel and a brake, said system including means mounting the steering wheel for movement in its entirety between upper and lower positions, the wheel being biased toward lower position, brake applying mechanism operable when the steering wheel moves from upper position, and means depriving the motor of its driving power when the steering wheel moves from said upper position.

14. A brake applying system for an automotive vehicle having a driving motor, a steering wheel and a brake, said system including means mounting the steering wheel for movement in its entirety between upper and lower positions, the wheel being biased toward lower position, brake applying mechanism operable when the steering wheel moves from upper position, and means operable to deprive the motor of its driving power just prior to movement of the steering wheel into said lower position.

15. A brake applying system for an automotive vehicle having a driving motor, a steering wheel and a brake, said system including means mounting the steering wheel for movement between upper and lower terminal positions through an intermediate position and said wheel being biased toward lower terminal position, mechanism for applying the brake operable when the steering wheel is in intermediate position and releasable when the steering wheel is in either of its terminal positions, and means operable to deprive the motor of its driving power when the steering wheel is in intermediate position.

16. A brake applying system for an automotive vehicle having a driving motor, a steering wheel and a brake, said system including means mounting the steering wheel for movement between upper and lower terminal positions through an intermediate position and said wheel being biased toward lower terminal position, mechanism for applying the brake operable when the steering wheel is in intermediate position and releasable when the steering wheel is moved to either of its terminal positions, and means operable to deprive the motor of its driving power just prior to movement of the steering wheel to intermediate position from its upper terminal position.

GLENN KEITH.
ALBERT H. KIRCHNER.